United States Patent [19]
Albrecht et al.

[11] Patent Number: 5,539,671
[45] Date of Patent: Jul. 23, 1996

[54] FOOD TEMPERATURE CONTROL SYSTEM

[75] Inventors: Lance M. Albrecht, Wallingford; Mario Pasquini, Milford; William M. Schreyer, Monroe, all of Conn.

[73] Assignee: Food Automation Service Techniques, Inc., Stratford, Conn.

[21] Appl. No.: 98,014

[22] Filed: Jul. 26, 1993

Related U.S. Application Data

[63] Continuation of Ser. No. 513,821, Apr. 24, 1990, abandoned, which is a continuation of Ser. No. 911,480, Sep. 25, 1986, abandoned.

[51] Int. Cl.⁶ .............................. A47J 37/12; G06F 19/00
[52] U.S. Cl. ................................ 364/557; 99/325; 99/342
[58] Field of Search ...................... 364/557, 556; 374/128, 149, 155; 99/325, 342, 344

[56] References Cited

U.S. PATENT DOCUMENTS

| | | | |
|---|---|---|---|
| 4,362,094 | 12/1982 | Polster | 99/342 |
| 4,370,731 | 1/1983 | Sasaki et al. | 364/900 |
| 4,467,184 | 8/1984 | Loessel | 219/506 |
| 4,489,646 | 12/1984 | Schmidt et al. | 99/330 |
| 4,505,194 | 3/1985 | Bishop et al. | 99/336 |
| 4,672,540 | 6/1987 | Waugh et al. | 364/400 |
| 4,700,617 | 10/1987 | Lee et al. | 99/327 |

*Primary Examiner*—Vincent N. Trans
*Attorney, Agent, or Firm*—Pennie & Edmonds

[57] ABSTRACT

A food-temperature control system includes apparatus for controlling the temperature of the food in a cooking vat and for providing an output signal representative of the status of the food. A holding station for the food is disposed remotely from the apparatus, A remote status indicator adjacent the holding station is coupled to the apparatus for indicating the status of the food at the holding station.

8 Claims, 3 Drawing Sheets

5,539,671

FOOD TEMPERATURE CONTROL SYSTEM

This is a continuation of application Ser. No. 07/513,821, filed Apr. 24, 1990, now abandoned, which was a continuation of application Ser. No. 06/911,480 filed Sep. 25, 1986, now abandoned.

This invention relates to a food-temperature control system and, more particularly, to such a system which utilizes a remote holding station for one or more cooked foods. Alternatively, the control system may have a holding station for a refrigerated food.

Heretofore, in fast-food restaurants which prepare food, for example, potato fries, in a cooking vat at one location, it has been common to transfer the cooked food to a holding station at another location to hold the food at a desired temperature. When food from more than one cooking vat was transferred to the same holding station having a plurality of heated compartments, a status indicator at the cooking vat would indicate when the food from that vat had been present at the holding station for the maximum permissible holding time without deterioration of the quality of the food. It would then be difficult for an operator to avoid confusion at the holding station as to which food at the holding station was indicated as being ready for removal.

It is an object of the present invention, therefore, to provide a new and improved food-temperature control system which avoids one or more of the disadvantages of prior such systems.

It is another object of the invention to provide a new and improved food-temperature control system which avoids confusion as to the identity of the food at a remote holding station which is ready for removal from the holding station.

In accordance with the invention, a food-temperature control system comprises apparatus for controlling the temperature of food and for providing an output signal representative of the status of the food at the apparatus. The control system includes a holding station for the food disposed remotely from the apparatus and a remote status indicator adjacent the holding station and coupled to the apparatus for indicating the status of the food at the holding station.

For a better understanding of the present invention, together with other and further objects thereof, reference is made to the following description, taken in connection with the accompanying drawings, and its scope will be pointed out in the appended claims.

Referring now to the drawings.

Figure 1:
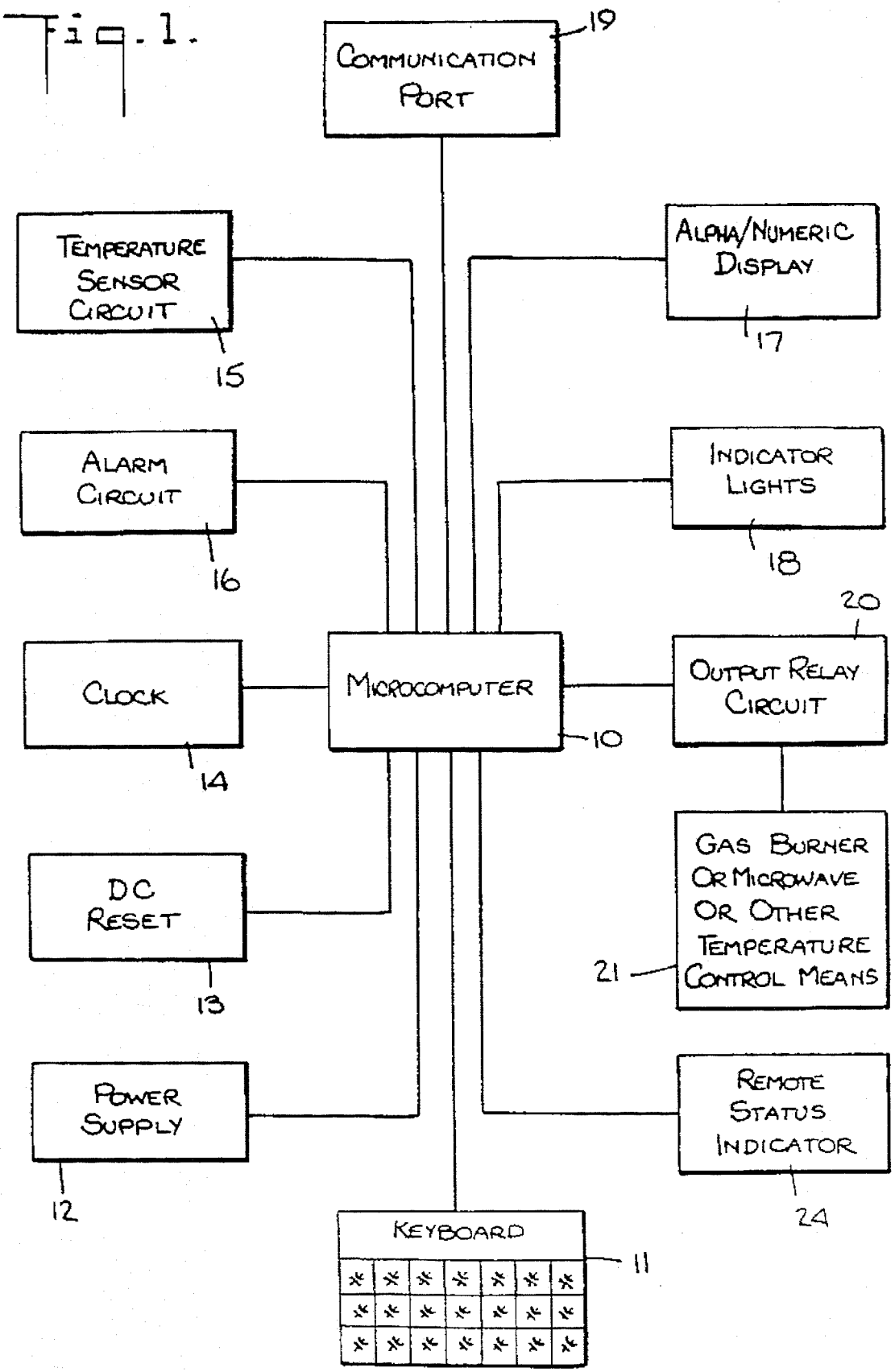
FIG. 1 is a schematic diagram of a food-temperature control system constructed in accordance with the invention.

Before referring to the drawings in detail, it will be understood that for purposes of clarity, the apparatus represented in block diagrams in FIGS. 1, 2, 3 and 4 utilizes, for example, an analog-to-digital converter and a microprocessor which includes such hardware as a central processing unit, program and random access memories, timing and control circuitry, input-output interface devices and other conventional digital subsystems necessary to the operation of the central processing unit as is well understood by those skilled in the art. The microprocessor operates according to the computer program produced according to the flow chart represented in the drawings.

Referring now more particularly to FIG. 1 of the drawings, there is represented a food-temperature control system comprising apparatus for controlling the temperature of food and for providing an output signal representative of the status of the food at the apparatus. More particularly, the temperature controlling apparatus includes a microcomputer 10 preferably at the cooking vat. The microcomputer 10 includes a central processing unit which receives an input from a keyboard 11 which may, for example, comprise a capacitive keyboard.

The temperature controlling apparatus includes a conventional power supply 12, a reset circuit 13 for resetting the microcomputer when renewing power in the power supply, a clock oscillator 14 for providing clock pulses to the microcomputer 10, a temperature sensor circuit 15 for sensing the temperature within the cooking apparatus, an audible alarm 16, an alpha/numeric display 17 and indicator lights 18. The food temperature control system also includes a communications port 19 for the microcomputer 10. The microcomputer 10 controls an output relay circuit 20 which may, for example, control the gas valves of a burner 21 or a heating element or microwave or other heating means. As will be more fully explained subsequently, the communication port 19 is provided for transmitting signals to and from other apparatus.

Figure 1A:
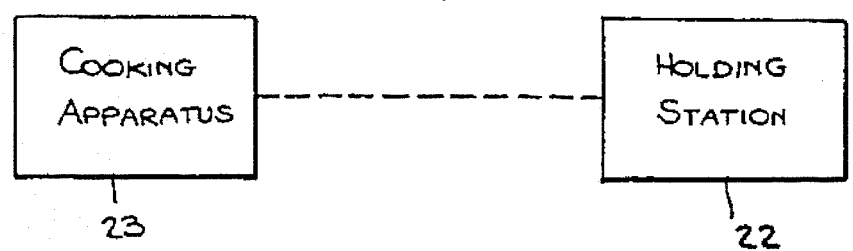
FIG. 1A is a schematic diagram representing cooking apparatus having a remote holding station in accordance with the invention.

The control system includes a holding station for the food represented in FIG. 1A remotely disposed from the apparatus for cooking the food and from the apparatus for controlling the temperature of the food.

Referring again to FIG. 1, the control system includes a remote status indicator 24 adjacent the holding station and coupled to the temperature controlling apparatus and more particularly to the microcomputer 10, for indicating the status of the food at the holding station. The remote status indicator provides an output signal representative of the food temperature and the time duration of the food at a given temperature at the holding station.

Figure 2:
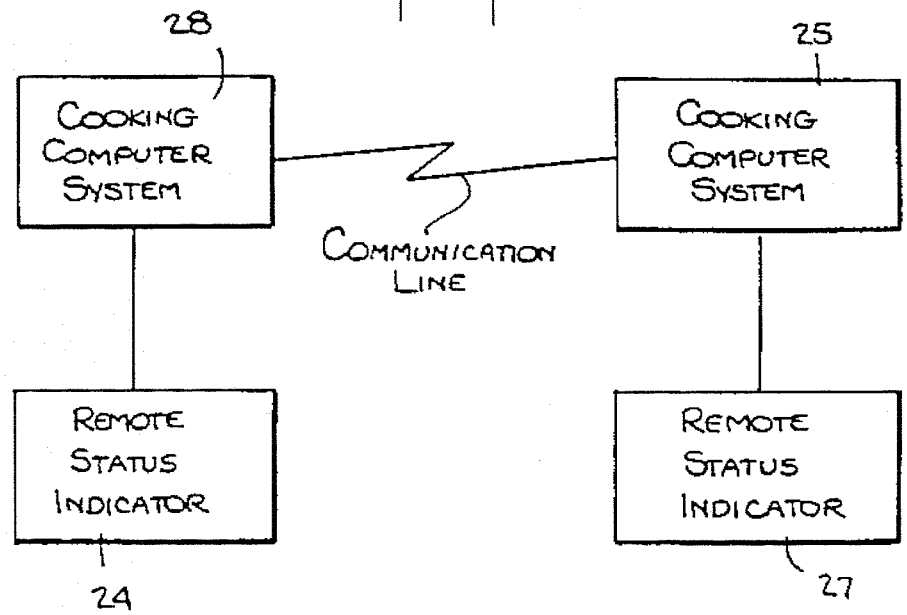
FIG. 2 is a schematic diagram of another embodiment of the control system constructed in accordance with the invention.

Referring now to FIG. 2 of the drawings, the temperature controlling apparatus may include a plurality of cooking computer systems 28, 25 located, for example, at separate cooking vats, for controlling the temperatures of the foods and for providing output signals representative of the statuses of the foods at the temperature controlling apparatus. It will be understood that each of the cooking computer systems 28, 25 preferably includes a microcomputer and its associated units such as the microcomputer 10 and its associated units as represented in FIG. 1. The cooking computer systems 28, 25 are coupled to remote status indicators 24, 27, respectively, for indicating the statuses of the foods at the holding station. For example, if the holding station is compartmentalized, the remote status indicator 24 associated with the cooking computer system 26 associated with one cooking vat may be disposed adjacent the compartment associated with the one cooking vat. Similarly, the remote status indicator 27 coupled to the cooking computer system 25 associated with a second cooking vat may be disposed adjacent the compartment associated with the second cooking vat. The cooking computer systems 28 and 25 are intercoupled through their communication ports so that the cooking computer system 28 is capable of providing or responding to an indication on the remote status indicator 24 or 27 and the cooking computer system 25 is capable of providing or responding to an indication on the remote status indicator 27 or 24. Each remote status indicator preferably provides an audible signal indicating the status of the food at the holding station and/or a visual signal indicating the status of the food at the holding station.

Figure 3:
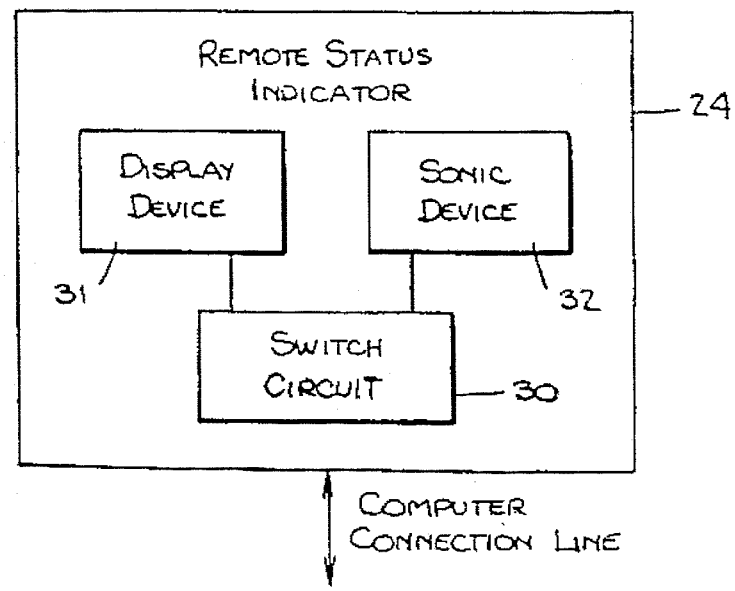
FIG. 3 is a schematic diagram of a remote status indicator utilized in an embodiment of the invention.

Referring now more particularly to FIG. 3 of the drawings, the remote status indicator 24 is schematically represented. The remote status indicator may include one or more switch circuits 30, a visual display device 31 and a sonic device 32 for making an audible alarm. The remote status indicator is coupled to the computer control systems of FIG. 2 and the switch circuits can, for example, signal back to either or both computer systems to cancel any holding station alarm status indication.

Figure 4:
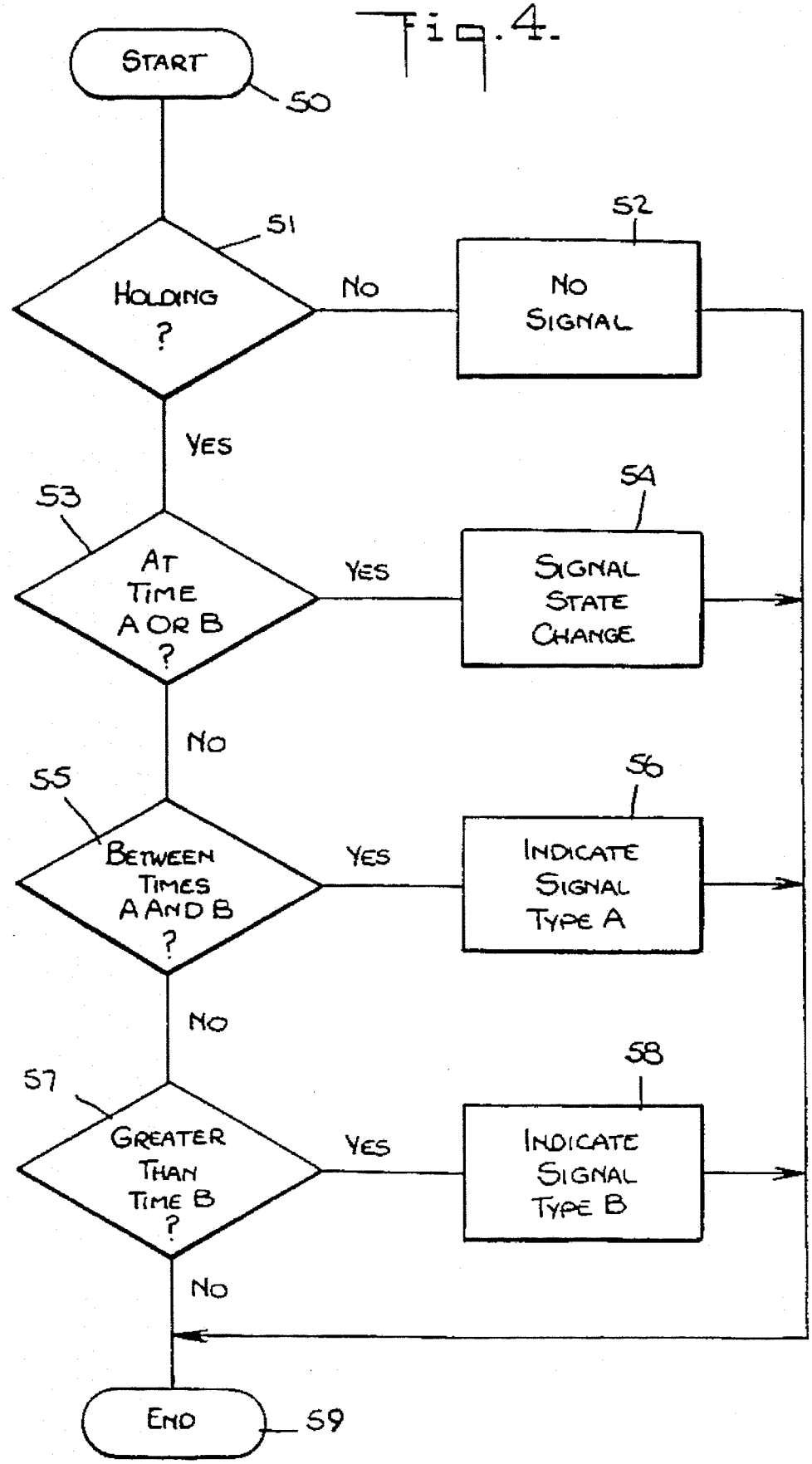
FIG. 4 is a flow chart comprising a representation of a portion of a microcomputer which operates according to a computer program produced according to the flow chart.

Considering now the operation of the food-temperature control system in accordance with the invention, with reference to the flow chart of FIG. 4, the food-temperature control system includes a start key 50 coupled to a "holding?" microprocessor portion 51. If the holding station is not holding a food product, the "no" output of the microprocessor portion 51 provides a "no" signal to a "no signal" microprocessor portion 52 which provides a signal to an "end" microprocessor portion 53. For purposes of clarity, two times, for example, time A and time B, have been designated as times to be recognized by the food-temperature control system. Signal type A may, for example, be a signal indicating a change of state of the product in the holding station by a five second pulsing audio tone followed by a change of state in the visual indicator. Possible states of the visual indicator are off; pulsing on and off; and full on. Signal type A is a pulsing on and off visual indication which alerts the operator and managers that there is a specific time, which is programmable, remaining before the product in the holding station must have some action performed. In the case of potato fries, the action to be performed after the time expires is to discard the potato fries left in the holding station. Another message to the manager is that a new batch of potato fries could be started so that freshly cooked fries are available on or before the previously cooked fries are discarded. Signal type B is the status indication that the product in the holding station has passed its final stage. This may be a sound alarm followed by a full on light indication.

If the "holding?" microprocessor portion 51 provides a "yes" output signal, the "yes" output signal is applied to a "at time A or time B?" microprocessor portion 53. If the microprocessor portion 53 provides a "yes" output signal, the "yes" signal is applied to a signal state change microprocessor portion 54 which in turn provides an output signal to the "end" portion 53. At this time no audible or visual signal is provided at the remote status indicator.

If the microprocessor portion 53 provides a "no" output signal, the "no" output signal is applied to a "between times A and B?" microprocessor portion 55. If a "yes" output signal is provided by microprocessor portion 55, the "yes" output signal is applied to "indicate signal type A" microprocessor portion 56 which is coupled to the remote signal indicator to cause the remote signal indicator 24 to provide a type A signal. The "indicate signal type A" microprocessor portion 56 is also coupled to the "end" microprocessor portion 53.

If a "no" output signal is provided by microprocessor portion 55, the "no" output signal is applied to a "greater than time B?" microprocessor portion 57. If the microprocessor portion 57 provides a "yes" output signal, the "yes" output signal is applied to "an indicate signal type B" microprocessor portion 58 which is coupled to the remote status indicator 24 to cause a type B signal indication at the remote status indicator 24. The microprocessor portion 58 is also coupled to the "end" microprocessor portion 53.

If the microprocessor portion 57 provides a "no" output signal, the "no" output signal is applied to the "end" microprocessor portion 53 and no signal is transmitted to the remote status indicator 24.

The communications between the cooking computers may consist of a variety of messages. One cooking computer may be designated as a master which polls or questions each computer on the communication line requesting a response if that computer has any message transmissions ready to transmit. Alternatively, the master may have status information to transmit in its own assigned time slot. In the case of a remote status indicator, the "cook done" status may be transmitted from the status indicator on the communication network of the cooking computers. The cooking computer which is physically connected to the status indicator uses its own "cook done" status indicator or the "cook done" status transmitted on the communication line by other cooking computers to re-start the programmed timed status indications sent to the remote status indicator.

While there has been described what is at present considered to be the preferred embodiment of this invention, it will be obvious to those skilled in the art that various changes and modifications may be made therein without departing from the invention, and it is, therefore, aimed to cover all such changes and modifications as fall within the true spirit and scope of the invention.

What is claimed is:

1. A method of controlling food temperature, comprising:

cooking the food in a cooking apparatus at a first location;

controlling the food-temperature during cooking and providing an output signal representative of the status of the food during cooking at the first location;

moving the food to a remote holding station after cooking thereof is completed, said holding station disposed at a second location remote from the first location of said cooking apparatus;

indicating the status of the food at the holding station by providing an output signal adjacent the holding station observable by an operator at the holding station, said signal representative of the food temperature and the time duration of the food at a given temperature at the holding station, wherein said step of indicating the status comprises, providing a first output signal at a first time to indicate a predetermined time remaining before an action is to be performed with respect to said food at the holding station, and providing a second output signal at a second time to indicate that said action is to be performed; and cooking additional food in the cooking apparatus at the first location while holding food in the holding station at the second, remote location.

2. The method in accordance with claim 1 which includes:

controlling the temperature of a plurality of foods while cooking the foods at separate first locations and providing output signals representative of the statuses of the foods;

moving the foods to and holding the foods at said remote holding station, said station disposed remotely from said first locations of cooking the food; and indicating the statuses of the foods at the holding station, the status of each separately cooked food being separately indicated.

3. The method in accordance with claim 1 in which the step of indicating the status of the food comprises providing an audible signal.

4. The method in accordance with claim 1 in which the step of indicating the status of the food comprises providing a visual signal.

5. The method in accordance with claim 1, wherein said step of cooking additional food is initiated in response to said first output signal.

6. The method in accordance with claim 5 wherein said predetermined time is approximately equal to the cooking time for the additional food.

7. A food temperature control system, comprising:

apparatus for cooking at least first and second batches of food, said apparatus including a cooking vat and means for containing food during cooking and means for heating said food;

temperature control apparatus including microcomputer means for controlling said heating means and status means for providing an output signal representative of the status of the food in said cooking apparatus, said status means being located at said cooking apparatus;

holding station means, disposed remotely from said cooking apparatus, for holding the first batch of food separately from said cooking apparatus and food containing means after cooking thereof is completed and during cooking of said second batch of food; and remote status indicator adjacent said holding station means and also remote from said cooking apparatus, said indicator communicating with said microcomputer means to provide an output signal representative of the expiration of a predetermined time before an action is to be taken with respect to the first batch of food in said holding station means.

8. A system in accordance with claim 7, wherein:

said cooking apparatus includes a plurality of said food containing means and said status means, each said status means associated with one of said food containing means;

said temperature control apparatus includes a plurality of said microcomputer means, each controlling one associated status means for providing output signals representative of statuses of the food in the associated food containing means;

said holding station means includes a plurality of food holding compartments, each said compartment for holding a first batch of food after cooking thereof; and said remote status indicator comprises a plurality of indicators, each adjacent an associated food holding compartment and communicating with said microcomputer means for indicating the status of the food at said associated compartment cooked in the associated food containing means.

* * * * *